United States Patent [19]
Zeller

[11] Patent Number: 5,303,809
[45] Date of Patent: Apr. 19, 1994

[54] TRANSPORTING SYSTEM WITH CYCLIC ADVANCE

[75] Inventor: Guenter Zeller, Donaueschingen-Grüningen, Fed. Rep. of Germany

[73] Assignee: Robert Bosch GmbH, Stuttgart, Fed. Rep. of Germany

[21] Appl. No.: 917,132

[22] PCT Filed: Nov. 16, 1991

[86] PCT No.: PCT/DE91/00895
§ 371 Date: Aug. 10, 1992
§ 102(e) Date: Aug. 10, 1992

[87] PCT Pub. No.: WO92/10417
PCT Pub. Date: Jun. 25, 1992

[30] Foreign Application Priority Data
Dec. 8, 1990 [DE] Fed. Rep. of Germany ....... 4039265

[51] Int. Cl.$^5$ ............................................. B65G 43/00
[52] U.S. Cl. .................................. 198/341; 198/346.1; 198/464.3; 198/465.3; 198/832.1
[58] Field of Search ................... 198/341, 346.1, 464.3, 198/465.1–465.3, 577, 832.1

[56] References Cited

U.S. PATENT DOCUMENTS

| | | |
|---|---|---|
| 4,454,939 | 6/1984 | Kampf et al. .................... 198/341 |
| 4,487,309 | 12/1984 | Dorner . | |
| 4,787,496 | 11/1988 | Prodel et al. .................... 198/346.1 |
| 4,934,507 | 6/1990 | Blocker .......................... 198/346.1 |

FOREIGN PATENT DOCUMENTS

| | | |
|---|---|---|
| 1556149 | 2/1970 | Fed. Rep. of Germany . |
| 3700192 | 12/1987 | Fed. Rep. of Germany . |
| 3729784 | 3/1989 | Fed. Rep. of Germany . |
| 3832845 | 7/1989 | Fed. Rep. of Germany . |
| 2306788 | 11/1976 | France . |

*Primary Examiner*—Joseph E. Valenza
*Attorney, Agent, or Firm*—Spencer, Frank & Schneider

[57] ABSTRACT

A transporting system for supplying and/or discharging workpieces disposed on carriers to at least one processing unit includes a cyclic conveyor driven by a drive as a function of the work cycle, particularly a web belt or chain conveyor which is equipped with cams that predetermine the position of each workpiece carrier in the conveying direction and enclose the workpiece carriers between them. A known stepping gear assembly is provided as the drive for the cyclic conveyor. A first signal generator detects the cyclic advance and a second signal generator detects the cycle time. The drive for the stepping gear assembly is controlled by signals of the signal generators so that the signal of the first signal generator switches off the drive as soon as the cyclic advance has been performed, and the signal of the second signal generator activates the drive at the end of the processing duration for a workpiece.

17 Claims, 4 Drawing Sheets

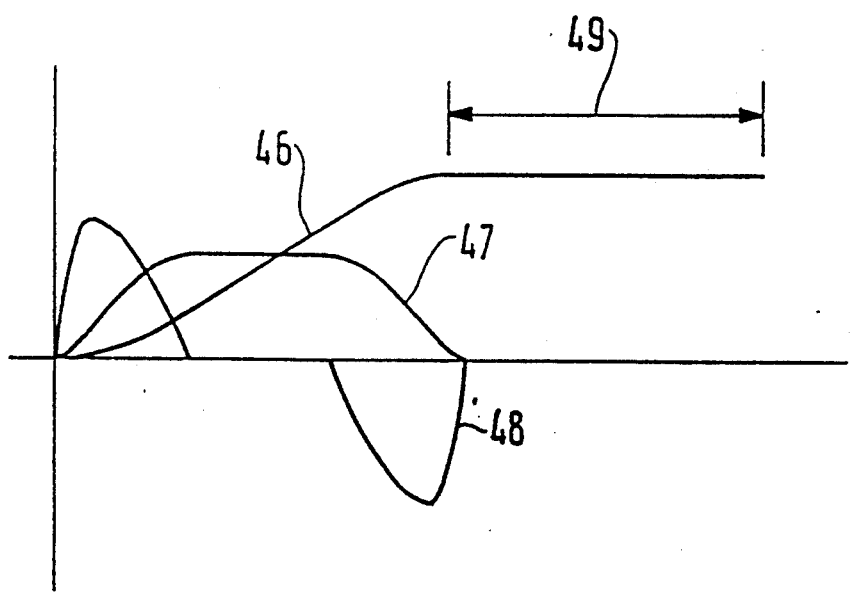

TRANSPORTING SYSTEM WITH CYCLIC ADVANCE

STATE OF THE ART

The invention is based on a transporting system of the type defined in the main claim. Such a transporting system is disclosed in Examined Published German Patent Application DE-AS 1,556,149. The transporting system disclosed there is intended for charging a continuously operating workpiece cleaning system. It includes a chain conveyor equipped with cam-like spacers which enclose the workpieces to be cleaned between them. A ratchet mechanism equipped with a crank drive serves to provide the step-wise movement of the chain conveyor. A crank arm equipped with a pawl is arranged opposite the teeth of the ratchet wheel in such a way that the acceleration of the ratchet wheel in the initial phase of a 90° rotation rises softly and in the final phase it drops gradually until the wheel is stopped. In this prior art transporting system, the basic cycle is determined by the structural configuration of the ratchet mechanism. A flexible control of the basic cycle is not possible.

ADVANTAGES OF THE INVENTION

In contrast thereto, the transporting system according to the invention including the characterizing features of the main claim has the advantage that a fast, cyclic advance can be realized with a mechanically simple structure, with the basic cycle being variable at any time with little control expenditures. The cyclic conveyor can thus be integrated without problems into a flexible transfer system for fully automatic assembly and/or workpiece processing lines. By connecting the mechanical stepping gear assembly which realizes the advancing movement of the workpiece carrier, with the signal generators which record the end of processing in the processing station and thus determine the basic cycle, the cyclic conveyor can be adapted to any processing time in the processing station. This permits the realization of high transporting speeds and a cycle time that is optimally adapted to the processing time.

Due to the measures defined in the dependent claims, advantageous modifications and improvements of the transporting system defined in the main claim become possible. It is of particular advantage that a new basic cycle begins only if the absence of the workpiece carrier at the outlet of the cyclic conveyor is recorded. This prevents crash situations at the outlet of the cyclic conveyor. The inclusion of the inlet of the cyclic conveyor in the control of the basic cycle offers the further advantage that a workpiece carrier loaded with a workpiece is grabbed in each basic cycle. A particularly suitable structure for the realization of the cyclic advance is that a plate cam gear assembly is employed as the stepping gear and the drive for the plate cam gear assembly is put out of action during the engagement angle of the cam disc. At high transporting speed, the cyclic advance is free of shocks and jerks. The cooperation of the plate cam gear assembly with the signal generator for switching off the drive of the plate cam gear assembly permits a high repetition accuracy in positioning the workpiece carriers loaded with workpieces in the processing station. The intermediary connection of a further drive between the driven shaft of the plate cam gears and the drive shaft of the cyclic conveyor permits the transporting of workpiece carriers having different length dimensions. It is then merely necessary to adapt the cams attached to the conveyor belt to the length of the workpiece carriers. The detent clutch whose torque is adjustable and which is connected in the path of the force transmission between the plate cam gears and the cyclic conveyor protects the drive against damage in the case of a malfunction. The speed of the cyclic advance can be varied by the use of a frequency converter for changing the number of revolutions of the three-phase motor, by the use of adjustment gears instead of a worm gear assembly or by a change in the transmission ratio of the worm gear assembly.

DRAWINGS

One embodiment of the invention is illustrated in the drawing and will be described in greater detail below together with the disclosure of further advantages.

FIG. 1 is a schematic representation in a top view of the transporting system as part of a transfer line, FIG. 2 is a side view of a cyclic conveyor seen in the conveying direction, FIG. 3 is a top view of the inlet and outlet of the cyclic conveyor, and FIG. 4 is a diagram showing the curves for travel, velocity and acceleration of a plate cam gear assembly.

DESCRIPTION OF THE EMBODIMENT

Figure 1:
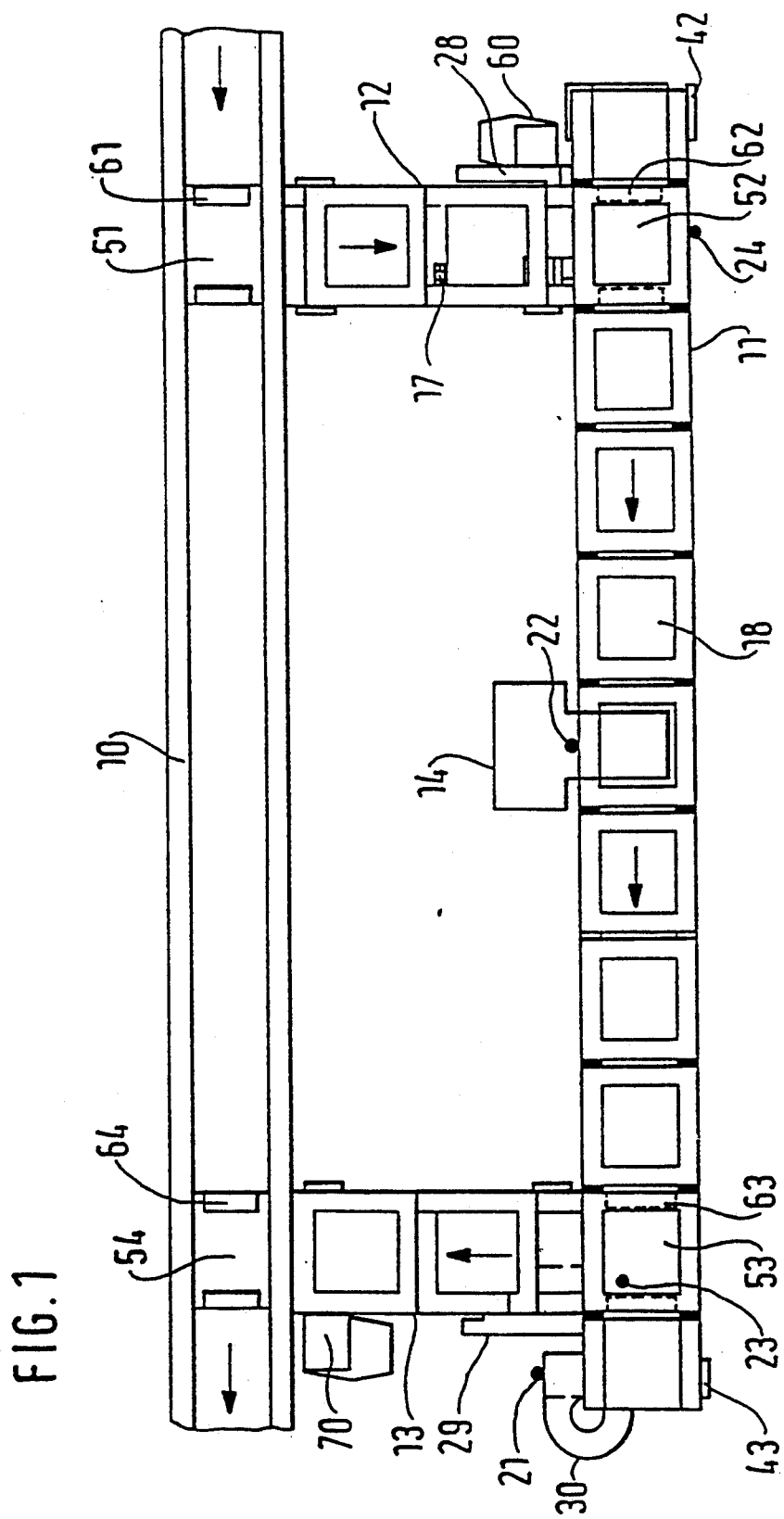

The transporting system shown in FIG. 1 is composed of a main conveying path 10, a feeder conveyor path 12, a cyclic conveyor 11 and a discharge conveyor path 13. A plurality of such transporting systems may be arranged at predetermined distances from one another along the main conveying path 10. The connection between main conveying path 10 and cyclic conveyor 11 is made at the inlet by means of feeder conveyor path 12 and at the outlet with discharge conveyor path 13, both extending at right angles to main conveying path 10. Charging zones 51 to 54 are disposed at the points where the individual conveying paths are connected. Charging zones 51 to 54 are equipped with transverse lifting units 61 to 64 which are not shown in detail and whose function it is to transfer a workpiece carrier 18 from the incoming conveying path to the conveying path disposed at a right angle thereto while maintaining the orientation of the workpiece carrier. Each conveying path 10, 11, 12 and 13 has its own drive 30, 60 and 70, with the drive for main conveying path 10 not being shown.

However, it is also conceivable that the feeder conveyor path 12 and the discharge conveyor path 12 [sic] are arranged in the direction of cyclic conveyor 11.

In the region of cyclic conveyor 11, there is disposed a processing station 14 for processing, installing or testing workpieces. The non-illustrated workpieces, which are disposed in workpiece carriers 18 that are equipped to accommodate them in the correct position, are successively fed into the processing station by means of cyclic conveyor ii. In this connection, a plurality of processing stations 14 may also be arranged one behind the other along the cyclic conveyor 11, with all of them either having the same processing duration or the rhythm of the cyclic conveyor 11 is adapted to the processing station having the longest processing duration.

In the present embodiment, conveyor paths 10, 11, 12, and 13 are configured as twin-belt conveyors. Since the configuration and operation of a twin-belt conveyor is known sufficiently to the person skilled in the art, a description thereof is not deemed necessary in the present specification.

Cyclic conveyor 11 is arranged parallel to and spaced from the main conveying path 10 and is configured as a module that can be employed in a transfer line in the region of processing stations. According to FIGS. 2 and 3, cyclic conveyor 11 includes a drive 30, for example a braked three-phase current electric motor, a worm gear assembly 31 and a plate cam gear assembly 32. The plate cam gear assembly 32 employs a cam disc which travels the path 46, has the velocity curve 47 and the acceleration curve 48 shown in FIG. 4. The cam disc has a cam track 49 that starts at 300°.

Figure 2:
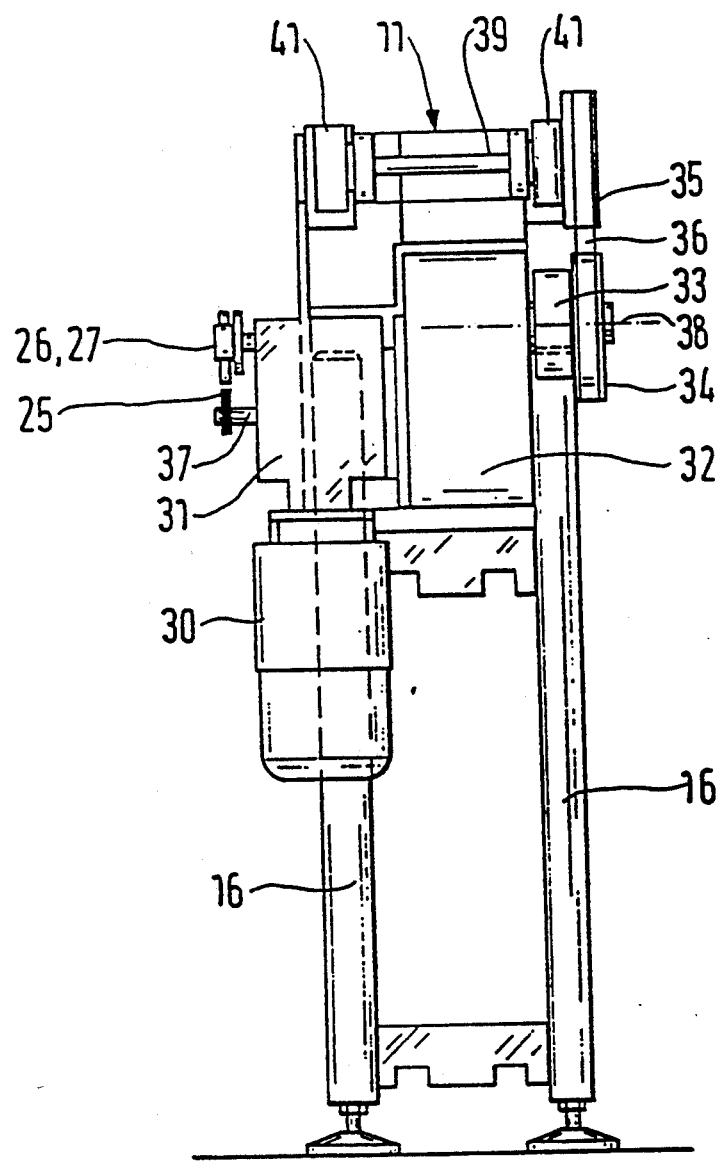
Figure 3:
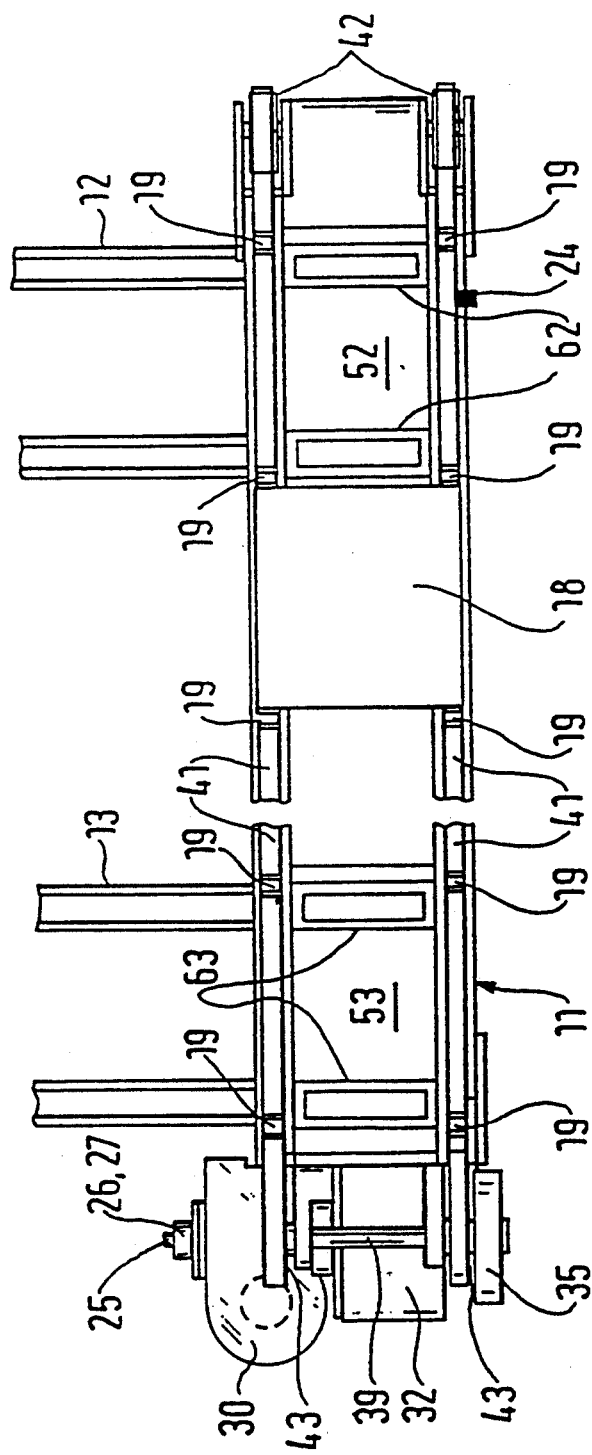

FIG. 2 shows that the twin-belt conveyor 40 of cyclic conveyor 11, drive 30, worm gear assembly 31 and plate cam gear assembly 32 are screwed to a stand 16. It is also conceivable to attach cyclic conveyor 11 as a component group without stand to existing devices or to any desired stands.

Twin-belt conveyor 40 has two web belts 41 which are each guided over a pair of reversal rollers 42 and 43. Roller pair 43 is fixed to a drive shaft 39. Reversal roller pairs 42 and 43 are configured as toothed rollers. The two web belts 41 are toothed belts which mesh with the teeth of the toothed rollers.

On their faces opposite the teeth, web belts 41 are equipped with cams 19 which enclose workpiece carriers 18 between them. Each cam 19 fulfills two functions. On the one hand, it serves as a carrier for a workpiece carrier 18 disposed on cyclic conveyor 11 and, on the other hand, as a stop for the next workpiece carrier following in the conveying direction. This makes it possible to have the smallest possible spacing between the individual workpiece carriers as predetermined by the width of the cams. Cams 19 may be made of the same material as web belts 41. It is also possible to vulcanize or glue rubber or plastic cams onto web belts 41. Moreover, webs, rails or the like that connect the two web belts 41 together, could also be employed as cams. However, it is important that the cams of the two web belts are arranged at the same height in the conveying direction.

The transfer of force from plate cam gear assembly 32 to twin-belt conveyor 40 is effected by means of a further toothed belt mechanism 34, 35, 36. FIG. 2 shows that a drive shaft 37 and a driven shaft 38 project from the sides of plate cam gear assembly 32. A control cam 25, which rotates together with drive shaft 37, is fastened to drive shaft 37. A toothed belt wheel 34 is flanged to driven shaft 38. The drive shaft 39 of twin-belt conveyor 40 is also connected with a toothed belt wheel 35. Toothed belt wheels 34 and 35 are enclosed by a toothed belt 36. A torque adjustable detent clutch 33 is included in the force lock between driven shaft 38 and toothed belt wheel 34 to protect drive 30 against overloads. By changing the transmission ratio of toothed belt wheels 34 and 35, the stroke of the cyclic advance can be varied. In this way it is possible to transport workpiece carriers having different length dimensions. However, the spacing of cams 19 must then be changed according to the stroke of the cyclic advance.

The control cam 25 disposed at the drive shaft 37 of plate cam gear assembly 32 constitutes a first signal generator 21 which attenuates two inductive limit switches 26 and 27. Limit switch 26 is positioned in such a way that drive 30 is switched off when the drive of plate cam gear assembly 32 has gone through a revolution of 300°. This position simultaneously identifies the beginning of the cam track 49 of the cam disc of plate cam gear assembly 32. The second limit switch 27 monitors the position of control cam 25 within cam track 49. If the second limit switch 27 is not attenuated by control cam 25, the cyclic advance has moved beyond its prescribed stroke. In this case, an error is signaled and a further cyclic advance is prevented. A second signal generator 22 is coupled with processing station 14 and furnishes a signal as soon as the influence of processing station 14 on the workpiece positioned on workpiece carrier 18 is terminated and workpiece carrier 18 is in its starting position on twin-belt conveyor 40. In most cases, processing station 14 is equipped with a non-illustrated lifting and positioning unit which lifts workpiece carrier 18 from web belts 41 in order to relieve twin-belt conveyor 40 and brings it into an exactly defined position with respect to processing station 14. If a lifting and positioning unit is employed, it is advisable to couple the second signal generator 22 with the lifting and positioning unit in such a way that it furnishes a signal as soon as the lifting and positioning unit has returned to its starting position. A third signal generator 23 is disposed at the outlet of the cyclic conveyor and a fourth signal generator 24 is disposed at the inlet of the cyclic conveyor. Signal generator 23 has been set in such a way that it furnishes a signal if no workpiece carrier 18 is present. The fourth signal generator 24 positioned at the inlet of cyclic conveyor 11 furnishes its signal if a workpiece carrier 18 is present (FIG. 1).

With the aid of the above described arrangement, the workpiece carriers 18 which are being transported continuously along the main conveying path 10 can be supplied in dependence on the established rhythm to one or a plurality of processing stations 14. In the region of charging zone 51, the workpiece carrier 18 disposed on main conveying path 10 is transferred by a first transverse lifting unit 61 to the adjacent feeder conveyor path 12. Feeder conveyor path 12, which constitutes the connection between main conveying path 10 and cyclic conveyor 11, is provided with a separator 17 upstream of the inlet of cyclic conveyor 11. Separator 17 cooperates with a rocker 28 attached to the side of the conveying path. Only after the rocker 28, which acts as a monitoring device, has signaled that no workpiece carrier 18 is disposed in the inlet of charging zone 52 of cyclic conveyor 11, will the separator release the next workpiece carrier.

As soon as the inlet of cyclic conveyor 11 has been released, the separated workpiece carrier 18 is brought by means of a second transverse lifting unit 62 into the second charging zone 52. Rocker 28 here additionally serves as a monitoring unit. Only after the workpiece carrier has passed rocker 28 and rocker 28 is again in its starting position and signal generator 24 has been attenuated, is this considered to be a signal that workpiece carrier 18 is accurately positioned between cams 19 on twin-belt conveyor 40 of cyclic conveyor 11. Workpiece carrier 18 is now enclosed between a pair of cams which predetermine its precise position on web belts 41.

Simultaneously with the positioning of a workpiece carrier 18 in the inlet of cyclic conveyor 11, a workpiece carrier 18 is discharged in the outlet of cyclic conveyor 11 from the charging zone 53 to discharge conveyor path 13. The transfer into discharge conveyor path 13 is effected by means of a third transverse lifting unit 63. In order to prevent clogging in discharge conveyor path 13, a monitoring device 29, likewise in the form of a rocker, is provided on the side of discharge conveyor belt 13 and reacts to the presence of a workpiece carrier 18. Only if monitoring device 29 has signalled, which is equivalent to no workpiece carrier 19 being present in the zone of discharge conveying path 12 adjacent to charging zone 53, is the third transverse lifting unit 63 activated to transfer a workpiece carrier 18 from cyclic conveyor 11 to discharge conveyor path 13. A further transverse lifting unit 64 is provided in charging zone 54 between discharge conveyor path 13 and main conveying path 10 to forward the workpiece carriers 18 from discharge conveyor path 13 for removal on main conveying path 10.

Let it be assumed that the work on the workpiece presently positioned in processing station 14 on workpiece carrier 18 has just been completed. A signal then emitted, as already described, by processing station 14 switches on an electric motor 30 which drives, by way of worm gear assembly 31, plate cam gear assembly 32 and toothed belt mechanism 34, 35, 36, the drive shaft 37 of the twin-belt conveyor in the direction of the arrow in FIG. 1. The switch for electric motor 30 is provided with a non-illustrated blocking circuit which permits turn-on only if, in addition to the signal from signal generator 22 indicating the end of processing, the signal generator 23 disposed in charging zone 53 indicates that no workpiece carrier 18 is positioned in the region of this charging zone. Thus it becomes impossible for a crash situation to develop within the cyclic conveyor 11. The coupling of the signals from the two signal generators 22 and 23 is then effected by means of a conventional AND-linkage. Additionally, the invention provides that a further signal is utilized which is furnished by signal generator 24 if a workpiece carrier 18 is present in the charging zone 52 at the inlet of the cyclic conveyor.

The signal from signal generator 24 is combined by means of an AND-linkage with the signals from signal generators 22 and 23. This circuit serves to ensure that a cyclic advance 11 is initiated only if the outlet of cyclic conveyor 11 is free and a workpiece carrier 18 is positioned in the inlet of cyclic conveyor 11. Thus it is ensured that workpiece carriers 18 are supplied to processing unit 14 without interruptions.

If the signals furnished by signal generators 22, 23 and 24 are present, an electric motor 30 is switched on and the cyclic advance of plate cam gear assembly 32 is realized. As soon as the cycle of movement of the cam disc has reached cam track 49, control cam 25 which is positioned on the drive shaft 78 of plate cam gears 32 switches off electric motor 30. Since a braked three-phase electric motor is employed, there is no dieseling. The motion curve of the cam disc and the transmission ratio of toothed belt mechanism 34, 35, 36 determine the stroke of the cyclic advance. In the present embodiment, one stroke of the cyclic advance is the length of a workpiece carrier 18 plus the cam width of a cam 19.

The torque dependent detent clutch 33, that is connected between the driven shaft 38 of the plate cam gear assembly 32 and the drive shaft 38 of twin-belt conveyor 40 serves as an additional security against a crash situation within cyclic conveyor 11 if a signal generator malfunctions and thus protects the electric motor 30 against overloads.

I claim:

1. A transporting system for supplying and/or discharging workpieces disposed on carriers to at least one processing unit, the system including a cyclic conveyor driven as a function of the work cycle, particularly a web belt or chain conveyor, which is equipped with cams that determine the position of each workpiece carrier in the conveying direction and enclose the workpiece carriers between them;
    wherein a known stepping gear assembly is provided to drive the cyclic conveyor;
    wherein a first signal generator is provided to detect the cyclic advance and a second signal generator to detect the cycle time;
    wherein the drive for the stepping gear assembly is controlled by the signals of the signal generators in such a manner that the signal of the first signal generator switches off the drive as soon as the cyclic advance has been performed, and the signal of the second signal generator activates the drive at the end of the processing duration for a workpiece;
    wherein the stepping gear assembly is a plate cam gear assembly; and
    wherein the first signal generator is positioned in such a way that it switches when the cam plate of the plate cam gear assembly is in its cam track.

2. A transporting system for supplying and/or discharging workpieces disposed on carriers to at least one processing unit, the system including a cyclic conveyor driven as a function of the work cycle, particularly a web belt or chain conveyor, which is equipped with cams that determine the position of each workpiece carrier in the conveying direction and enclose the workpiece carriers between them;
    wherein a known stepping gear assembly is provided to drive the cyclic conveyor;
    wherein a first signal generator is provided to detect the cyclic advance and a second signal generator to detect the cycle time;
    wherein the drive for the stepping gear assembly is controlled by the signals of the signal generators in such a manner that the signal of the first signal generator switches off the drive as soon as the cyclic advance has been performed;
    'wherein the signal of the second signal generator activates the drive at the end of the processing duration for a workpiece; and
    wherein a torque adjustable detent clutch is connected between a driven shaft of the stepping gear assembly and a drive shaft of the cyclic conveyor.

3. A transporting system according to claim 1, wherein a third signal generator is disposed at the outlet of the cyclic conveyor to react to the absence of the workpiece carrier;
    wherein the signals of the second and third signal generators are connected with an AND-linkage, with the signal of the AND-linkage activating the drive;
    wherein a- fourth signal generator reacting to the presence of the workpiece carrier is disposed at the inlet of the cyclic conveyor; and
    wherein the signals of the second, third and fourth signal generators are connected with the AND-linkage, with the signal of the AND-linkage activating the drive.

4. A transporting system according to claim 2, wherein the stepping gear assembly is a plate cam gear assembly and wherein the first signal generator is positioned in such a way that it switches when the cam plate of the plate cam gear assembly is in its cam track.

5. A transporting system according to claim 4, wherein the first signal generator is a cam that is flanged to a driven shaft of the plate cam gear assembly.

6. A transporting system according to claim 4, wherein the drive includes a braked electric motor and a worm gear assembly intermediately connected to transfer the force from the electric motor to the plate cam gear assembly.

7. A transporting system according to claim 4, wherein a further gear assembly is intermediately connected between the driven shaft of the late cam gear assembly and a drive shaft of the cyclic conveyor.

8. A transporting system according to claim 7, wherein the further gear assembly is formed of a toothed belt wheel that is flanged to the driven shaft and a second toothed belt wheel that is flanged to the drive shaft of the cyclic conveyor and wherein both toothed belt wheels are in communication by way of a toothed belt.

9. A transporting system according to claim 1, wherein a torque adjustable detent clutch is connected between a driven shaft of the stepping gear assembly and a drive shaft of the cyclic conveyor.

10. A transporting system according to claim 1, wherein a feeder conveyor path is provided upstream of the cyclic conveyor in the conveying direction and a discharging conveyor path is provided downstream of the cyclic conveyor in the conveying direction;

wherein the cyclic conveyor is configured as a secondary path which has the same conveying direction and is arranged parallel to a main conveying path, and the feeder conveyor path and the discharge conveyor path extend transversely to the main conveying path and in opposite directions to one another;

wherein a charging zone is provided in each branch; and wherein each conveying path is equipped with its own drive.

11. A transporting system according to claim 10, wherein each charging zone is equipped with a transverse lifting unit which transfers the workpiece carrier, while maintaining its orientation, at a right angle to the adjacent conveyor path.

12. A transporting system according to claim 10, wherein the feeder conveyor path is equipped with a separator that responds to a switch-off signal for a drive of the feeder conveyor path.

13. A transporting system according to claim 11, wherein a monitoring device is disposed at each of the feeder conveyor path and at the discharge conveyor path, wherein the monitoring device disposed at the feeder conveyor path releases the signal of the first signal generator only if the workpiece carrier is positioned in the charging zone, and wherein the monitoring device disposed at the discharge conveyor path cooperates with the transverse lifting unit of the charging zone in such a manner that a workpiece carrier is removed from the cyclic conveyor only if no workpiece carrier is present in the transfer region of the discharge conveyor path.

14. A transporting system according to claim 1, wherein the first signal generator is a cam that is flanged to a driven shaft of the plate cam gear assembly.

15. A transporting system according to claim 1, wherein the drive includes a braked electric motor and a worm gear assembly intermediately connected to transfer force from the electric motor to the plate cam gear assembly.

16. A transporting system according to claim 1, wherein a further gear assembly is intermediately connected between the driven shaft of the plate cam gear assembly and a drive shaft of the cyclic conveyor.

17. A transporting system according to claim 16, wherein the further gear assembly is formed of a toothed belt wheel that is flanged to the driven shaft and a second toothed belt wheel that is flanged to a drive shaft of the cyclic conveyor and both toothed belt wheels are in communication by way of a toothed belt.

* * * * *